United States Patent
Al-Gouhi et al.

(10) Patent No.: US 10,905,975 B2
(45) Date of Patent: Feb. 2, 2021

(54) REMOVABLE TRAP STATIONS FOR HYDROCARBON FLOWLINES

(71) Applicant: Saudi Arabian Oil Company, Dhahran (SA)

(72) Inventors: Alwaleed Abdullah Al-Gouhi, Dhahran (SA); Mayadah M. Alhashem, Dammam (SA); Ibrahim Shaia Al Dossari, Dhahran (SA); Xiaolong Dennis Cai, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/192,355

(22) Filed: Nov. 15, 2018

(65) Prior Publication Data
US 2020/0155973 A1   May 21, 2020

(51) Int. Cl.
*B01D 21/24* (2006.01)
*E21B 43/34* (2006.01)
*B01D 21/02* (2006.01)

(52) U.S. Cl.
CPC ........ *B01D 21/2472* (2013.01); *B01D 21/02* (2013.01); *B01D 21/2483* (2013.01);
(Continued)

(58) Field of Classification Search
CPC ............ B01D 21/2483; B01D 21/30; B01D 2221/04; E21B 43/34
(Continued)

(56) References Cited

U.S. PATENT DOCUMENTS 774,519 A * 11/1904 Greenaway ............ B01D 45/08
  55/442
2,508,761 A * 5/1950 Kroboth .................. E03C 1/282
  210/532.1
(Continued)

FOREIGN PATENT DOCUMENTS

DE       29704839       7/1998
DE       19912705       9/2000
(Continued)

OTHER PUBLICATIONS

"Solids Interceptors," Zurn Product Chart, available on or before Jun. 14, 2017, 9 pages.
(Continued)

*Primary Examiner* — Christopher Upton
(74) *Attorney, Agent, or Firm* — Fish & Richardson P.C.

(57) ABSTRACT

Removable trap stations for hydrocarbon flowlines can be implemented as an apparatus. The apparatus includes a multi-phase fluid receiver body and a tank defining an interior volume. The fluid receiver body is configured to couple to a flowline carrying a multi-phase fluid including solids and liquids. The fluid receiver body includes an inlet portion configured to receive a portion of the multi-phase fluid including a portion of the solids flowing through the flowline into the receiver body. The fluid receiver body includes an outlet portion fluidically coupled to the inlet portion. The portion of the multi-phase fluid is configured to flow from the inlet portion to the outlet portion. The tank is fluidically and detachably coupled to the outlet and is configured to receive and retain the portion of the multi-phase fluid received through the inlet portion.

5 Claims, 6 Drawing Sheets

(52) U.S. Cl.
CPC .......... *E21B 43/34* (2013.01); *B01D 21/2405* (2013.01); *B01D 2221/04* (2013.01)

(58) Field of Classification Search
USPC ..... 210/803, 86, 532.1, 533; 166/267, 75.12
See application file for complete search history.

(56) References Cited

U.S. PATENT DOCUMENTS

| | | | |
|---|---|---|---|
| 4,106,562 A * | 8/1978 | Barnes | E21B 43/34 166/75.12 |
| 4,949,682 A * | 8/1990 | Klein | F01P 11/06 210/803 |
| 5,346,629 A | 9/1994 | Wueller | |
| 6,419,730 B1 * | 7/2002 | Chavez | B01D 45/08 96/189 |
| 6,790,367 B2 | 9/2004 | Schmigel et al. | |
| 7,311,818 B1 * | 12/2007 | Gurfinkel | B01D 21/30 210/532.1 |
| 9,095,799 B1 * | 8/2015 | Packard | E21B 43/34 |
| 10,385,635 B1 * | 8/2019 | Tucker | B01D 21/30 |
| 2011/0266228 A1 | 11/2011 | Brown et al. | |
| 2013/0134109 A1 * | 5/2013 | Tweit | B01D 21/2483 210/803 |
| 2013/0228075 A1 | 7/2013 | Zylla | |
| 2013/0233414 A1 * | 9/2013 | Valencia, Jr. | B01D 21/2405 210/532.1 |
| 2015/0090122 A1 * | 4/2015 | Hemstock | B01D 21/2483 95/241 |
| 2015/0144541 A1 * | 5/2015 | Balasubramanian | B01D 24/4869 210/86 |
| 2016/0082377 A1 | 3/2016 | Hemstock | |
| 2018/0154318 A1 * | 6/2018 | Al-Gouhi | E21B 43/34 |
| 2019/0060795 A1 * | 2/2019 | Bulekbay | E21B 43/34 |

FOREIGN PATENT DOCUMENTS

| | | |
|---|---|---|
| DE | 10212242 | 2/2004 |
| DE | 102008056496 | 5/2010 |
| EP | 0497295 | 8/1992 |
| WO | WO 2018080322 | 5/2018 |

OTHER PUBLICATIONS energyweldfab.com [online], "Sandtraps," Energy weldfab, Manufacturer of Oil and Gas Processing Equipment, available on or before Jun. 25, 2016, retrieved on Oct. 11, 2018, retrieved from URL: <https://www.energyweldfab.com/sandtraps/>, 3 pages.

International Search Report and Written Opinion issued in International Application No. PCT/US2019/061141 dated Mar. 19, 2020, 14 pages.

* cited by examiner

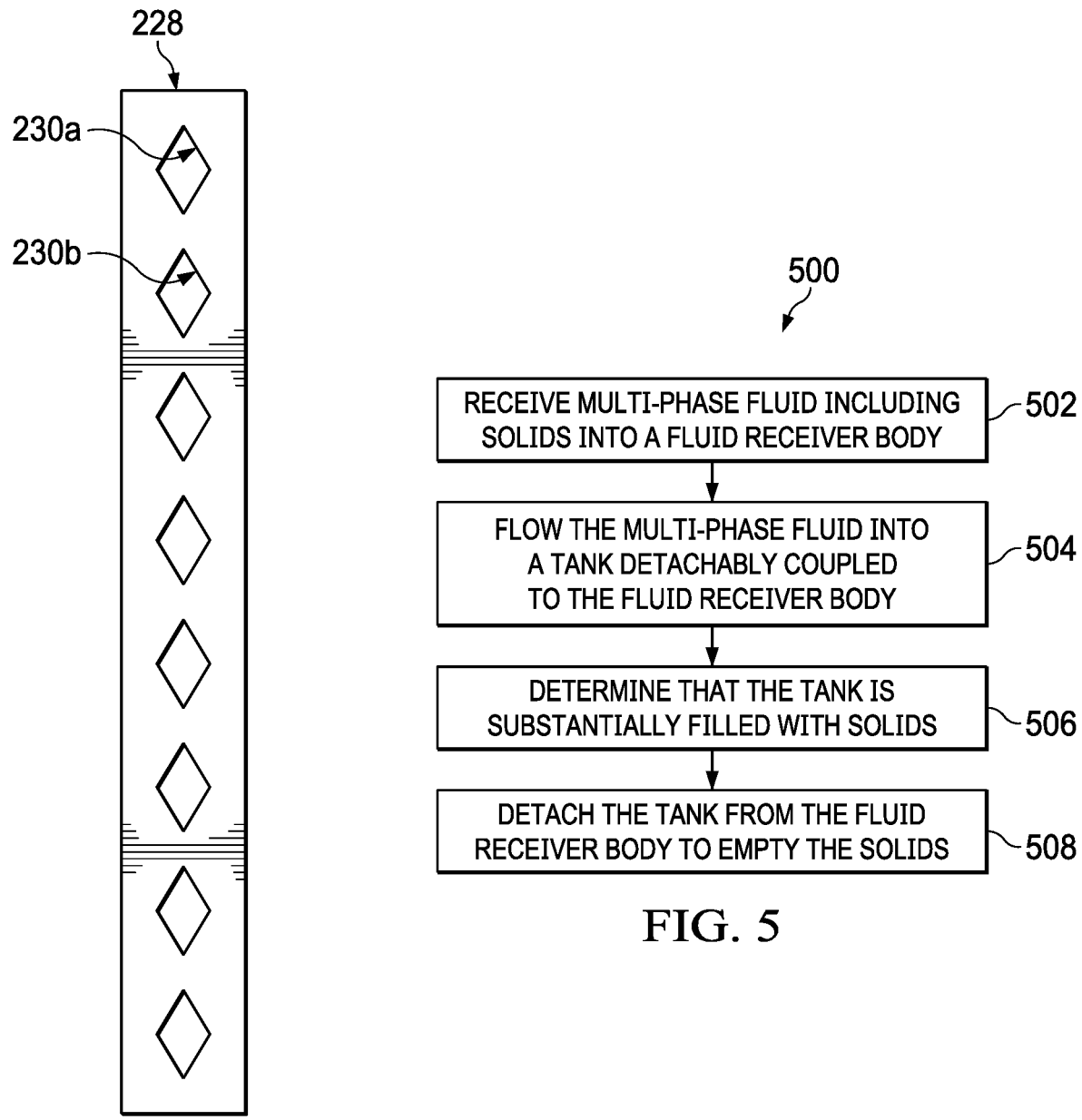

REMOVABLE TRAP STATIONS FOR HYDROCARBON FLOWLINES

TECHNICAL FIELD

This disclosure relates to flow of multi-phase fluid including solids and liquids, for example, through flowlines and, more particularly, to removing the solids from the multi-phase fluid.

BACKGROUND

Hydrocarbons entrapped in sub-surface reservoirs are produced (that is, extracted and raised to the surface) through wellbores formed in the reservoirs. The produced hydrocarbons are transported from the surface to other locations (for example, gas-oil separation plants) through flowlines. The produced hydrocarbons are multi-phase fluids that can include at least two of solids, liquids or gases. Solids flowing through a flowline can accumulate over time. Scraping is the practice of removing accumulated practices from the flowline.

SUMMARY

This disclosure describes technologies related to removable trap stations for hydrocarbon flowlines.

Certain aspects of the subject matter described in this disclosure can be implemented as an apparatus. The apparatus includes a multiple-phase fluid receiver body and a tank defining an interior volume. The fluid receiver body is configured to couple to a flowline carrying a multi-phase fluid including solids and liquids. The fluid receiver body includes an inlet portion configured to receive a portion of the multi-phase fluid including a portion of the solids flowing through the flowline into the receiver body. The fluid receiver body includes an outlet portion fluidically coupled to the inlet portion. The portion of the multi-phase fluid is configured to flow from the inlet portion to the outlet portion. The tank is fluidically and detachably coupled to the outlet and is configured to receive and retain the portion of the multi-phase fluid received through the inlet portion.

Aspects of the disclosure combinable with any of the other aspects of the disclosure can include the following features. The apparatus includes a valve assembly configured to permit or prevent fluid flow from the outlet portion into the tank.

Aspects of the disclosure combinable with any of the other aspects of the disclosure can include the following features. The valve assembly includes a bore valve.

Aspects of the disclosure combinable with any of the other aspects of the disclosure can include the following features. The valve assembly is coupled to the outlet portion. The valve assembly remains with the outlet portion when the valve assembly is closed and the tank is detached from the fluid receiver body.

Aspects of the disclosure combinable with any of the other aspects of the disclosure can include the following features. The apparatus includes a seal configured to fluidically seal the tank to the outlet portion.

Aspects of the disclosure combinable with any of the other aspects of the disclosure can include the following features. The seal is a flange seal.

Aspects of the disclosure combinable with any of the other aspects of the disclosure can include the following features. The seal is coupled to the outlet portion.

Aspects of the disclosure combinable with any of the other aspects of the disclosure can include the following features. The apparatus includes a sensor assembly coupled to the tank. The sensor assembly is configured to determine that the tank is substantially filled with solids.

Aspects of the disclosure combinable with any of the other aspects of the disclosure can include the following features. The tank includes a tank inlet fluidically coupled to the outlet portion. The sensor assembly is coupled to the tank inlet.

Aspects of the disclosure combinable with any of the other aspects of the disclosure can include the following features. The sensor assembly includes a wave source configured to transmit an electromagnetic wave, a wave sensor configured to receive the electromagnetic wave transmitted by the wave source and transmit a signal representing a magnitude of the electromagnetic wave, and a processor coupled to the wave sensor. The processor is configured to receive the signal from the wave sensor and to determine that the tank is substantially filled with solids based on the magnitude of the electromagnetic wave.

Aspects of the disclosure combinable with any of the other aspects of the disclosure can include the following features. The apparatus includes a weigh scale coupled to the tank. The weigh scale is configured to sense a weight of the solids in the tank. The processor is configured to determine that the tank is substantially filled with solids based on the weight sensed by the weigh scale.

Aspects of the disclosure combinable with any of the other aspects of the disclosure can include the following features. The wave source and the wave sensor are arranged substantially parallel to the flowline to which the fluid receiver body is coupled.

Aspects of the disclosure combinable with any of the other aspects of the disclosure can include the following features. The fluid receiver body includes a perforated plate member configured to be coupled to the flowline. The perforated plate member can receive the portion of the multi-phase fluid.

Aspects of the disclosure combinable with any of the other aspects of the disclosure can include the following features. The perforated plate member includes tapered portions that incline away from the flowline and toward the inlet portion.

Aspects of the disclosure combinable with any of the other aspects of the disclosure can include the following features. The apparatus includes an elongated tubular member fluidically coupled to the flowline downstream of the fluid receiver body. The elongated tubular member is inclined vertically upward relative to and away from the fluid receiver body.

Certain aspects of the subject matter described in this disclosure can be implemented as an apparatus. From a flowline carrying a multi-phase fluid including solids and liquids, a portion of the multi-phase fluid including a portion of the solids is received into a multi-phase fluid receiver body fluidically coupled to the flowline. The portion of the multi-phase fluid is flowed into a tank fluidically and detachably coupled to the fluid receiver body. After flowing the portion of the multi-phase fluid into the tank, it is determined that the tank is substantially filled with the solids. In response to determining that the tank is substantially filled with the solids, the tank is detached from the fluid receiver body. The fluid receiver body remains coupled to the flowline after the tank is detached.

Aspects of the disclosure combinable with any of the other aspects of the disclosure can include the following features. To determine that the tank is substantially filled with the solids, a magnitude of an electromagnetic wave transmitted by a wave source coupled to the tank and sensed by a wave sensor coupled to the tank is determined.

Aspects of the disclosure combinable with any of the other aspects of the disclosure can include the following features. A weigh scale coupled to the tank determines a weight of the solids in the tank to determine that the tank is substantially filled with the solids.

Aspects of the disclosure combinable with any of the other aspects of the disclosure can include the following features. A valve assembly coupled to an outlet portion of the fluid receiver body prevents flow of the portion of the multi-phase fluid out of the fluid receiver body before detaching the tank from the fluid receiver body.

Aspects of the disclosure combinable with any of the other aspects of the disclosure can include the following features. The solids in the tank are emptied and the tank is re-coupled to the fluids receiver body.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2C is a schematic diagram of a component of the trap station of FIGS. 2A and 2B.

FIG. 5 is a flowchart of an example of a process for trapping solids using the trap station of FIGS. 2A and 2B.

Like reference numbers and designations in the various drawings indicate like elements.

DETAILED DESCRIPTION

This disclosure describes a trap station that can be detachably coupled to a flowline carrying multi-phase fluids (for example, hydrocarbons produced from sub-surface reservoirs). The multi-phase fluid includes at least two of solids, liquids or gases. The trap station is coupled to the flowline such that some of the multi-phase fluid including solids flows into the trap station and accumulates over time. When a pre-determined quantity of the solids has accumulated, the trap station can be detached from the flowline without interrupting the flow of the rest of the multi-phase fluids through the flowline. A new trap station can be coupled to the flowline in place of the detached trap station. Alternatively, the trap station can be emptied and re-coupled to the flowline. In this manner, solids can be removed from the flowline without interrupting flow through the flowline. Also, the frequency of use of scrapers to remove solids from the flowline can also be reduced. Another advantage is to decrease the potential of scrapers getting stuck or slowed down in the pipelines. The trap station can be easily monitored remotely, reducing the need for personnel interference with the process.

Figure 1:
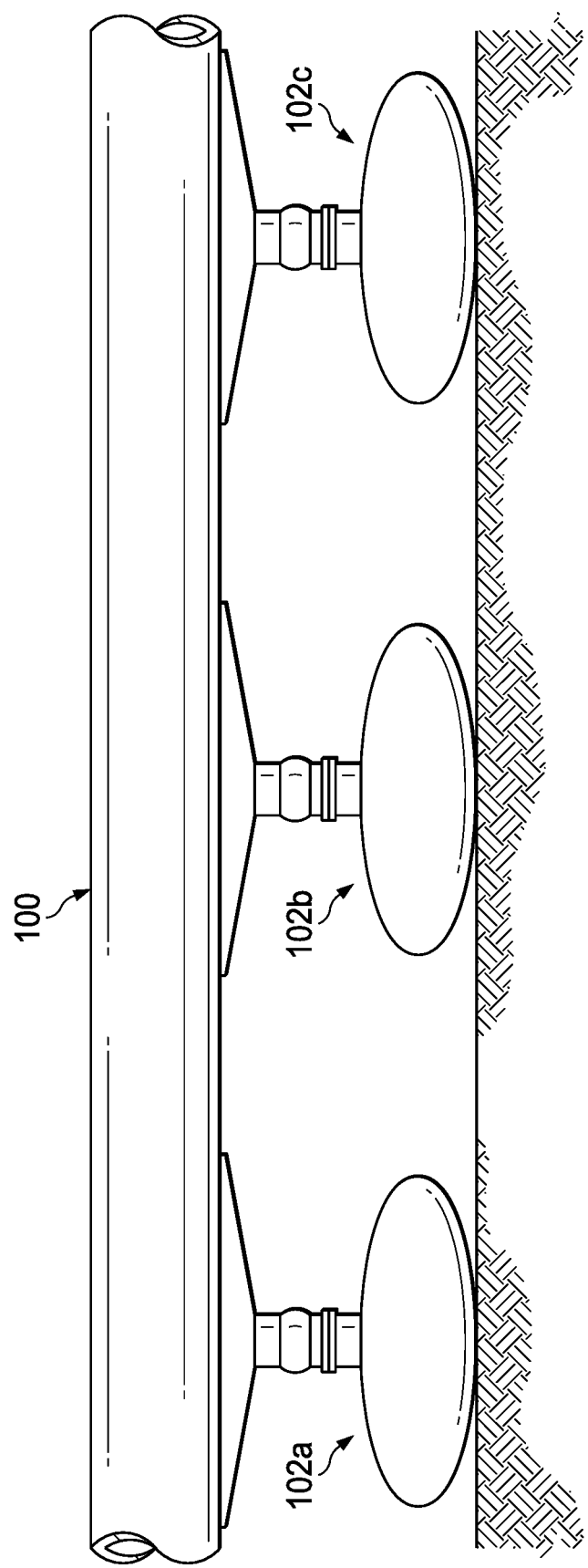
FIG. 1 is a schematic diagram of an example of a flowline to which multiple trap stations are coupled.

FIG. 1 is a schematic diagram of an example of a flowline 100 to which multiple trap stations (for example, a trap station 102a, a trap station 102b, a trap station 102c) are coupled. Multi-phase fluid including at least two of solids, liquids, or gases can be flowed through the flowline 100. For example, one end of the flowline 100 can be fluidically coupled to a wellhead at the surface of a wellbore through which hydrocarbons are produced. Another end of the flowline 100 can be coupled to a hydrocarbon processing plant (for example, a gas-oil separation plant). The flowline 100 can be cylindrical with a circular (or other) cross-section. Each trap station can be coupled to the bottom surface of the flowline 100. That is, each trap station can be positioned between the flowline 100 and the surface (for example, the ground) that supports the flowline 100. In the context of this disclosure, "fluidically coupled" means that two structures can be coupled to permit fluid flow between the structures without any leakage of the fluid at the coupling interface. In some instances, the coupling can be permanent such that the two structures cannot be re-attached upon detachment. In some instances, the coupling can be detachable such that the two structures can be re-attached and the fluidic coupling re-established upon detachment.

In this position, a portion of the multi-phase fluid that includes solids and liquids can flow from the flowline 100 into a trap station due to gravity while a remainder of the multi-phase fluid continues to flow through the flowline 100. The solids settle to the bottom of the trap station and, over time, accumulate in the trap station. Once the trap station has been filled with a pre-determined amount of solids, then the flow of the multi-phase fluid into a portion of the trap station can be ceased, and the trap station can be detached from the flowline 100, as explained in detail below.

In the context of this disclosure, the multi-phase fluid flowed through the flowline 100 includes hydrocarbons that include solids such as sand. The trap station described here can be used with other flowlines through which other multi-phase fluids carrying solids are flowed. Also, the flowline 100 can extend over long distances, for examples, hundreds or thousands of kilometers. Multiple trap stations can be coupled to the flowline 100 at respective locations to increase a quantity of solids trapped in the trap stations.

Figure 2A:
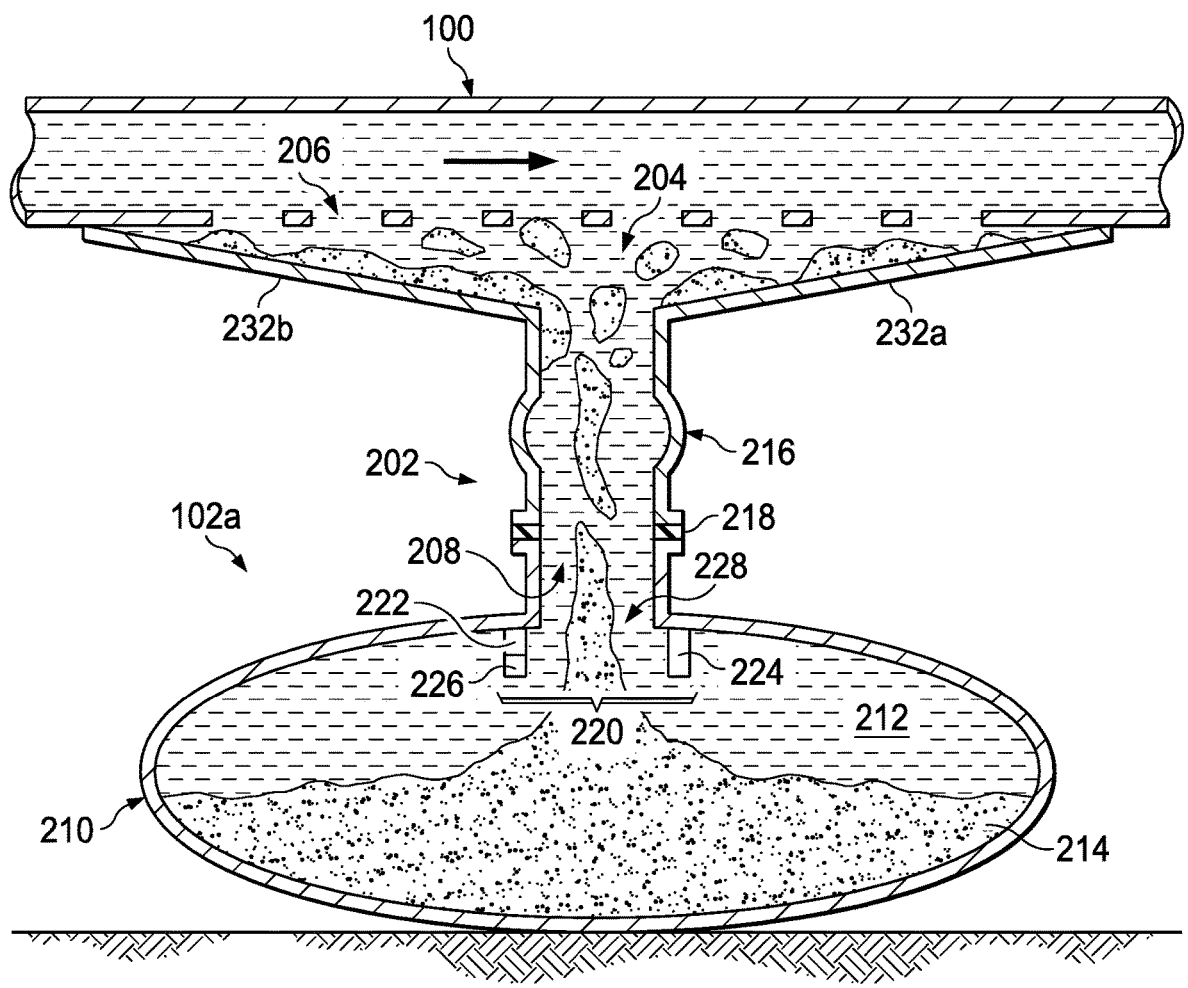
FIG. 2A is a schematic diagram of an example of a trap station coupled to the flowline.

FIG. 2A is a schematic diagram of the trap station 102a coupled to the flowline 100. Other trap stations that can be coupled to the flowline can be substantially identical to the trap station 102a. The trap station 102a includes a multi-phase fluid receiver body 202 that can be fluidically coupled to the flowline 100, for example, to the bottom portion of the flowline 100. The fluid receiver body 202 can include an inlet portion 206 that can receive a portion of the multi-phase fluid 204 that includes a portion of the solids flowing through the flowline 100 into the fluid receiver body 202. The fluid receiver body 202 can include an outlet portion 208 coupled to the inlet portion 206. For example, the inlet portion 206 and the outlet portion 208 can be coupled by an elongated tubular member through which the portion of the multi-phase fluid 204 can flow. The elongated tubular member can have a circular or other cross-sectional shape. The trap station 102a can include a tank 210 defining an interior volume 212. The tank 210 can be fluidically and detachably coupled to the outlet 208 and can receive and retain the portion of the multi-phase fluid 204 received through the inlet portion 206.

Figure 2B:
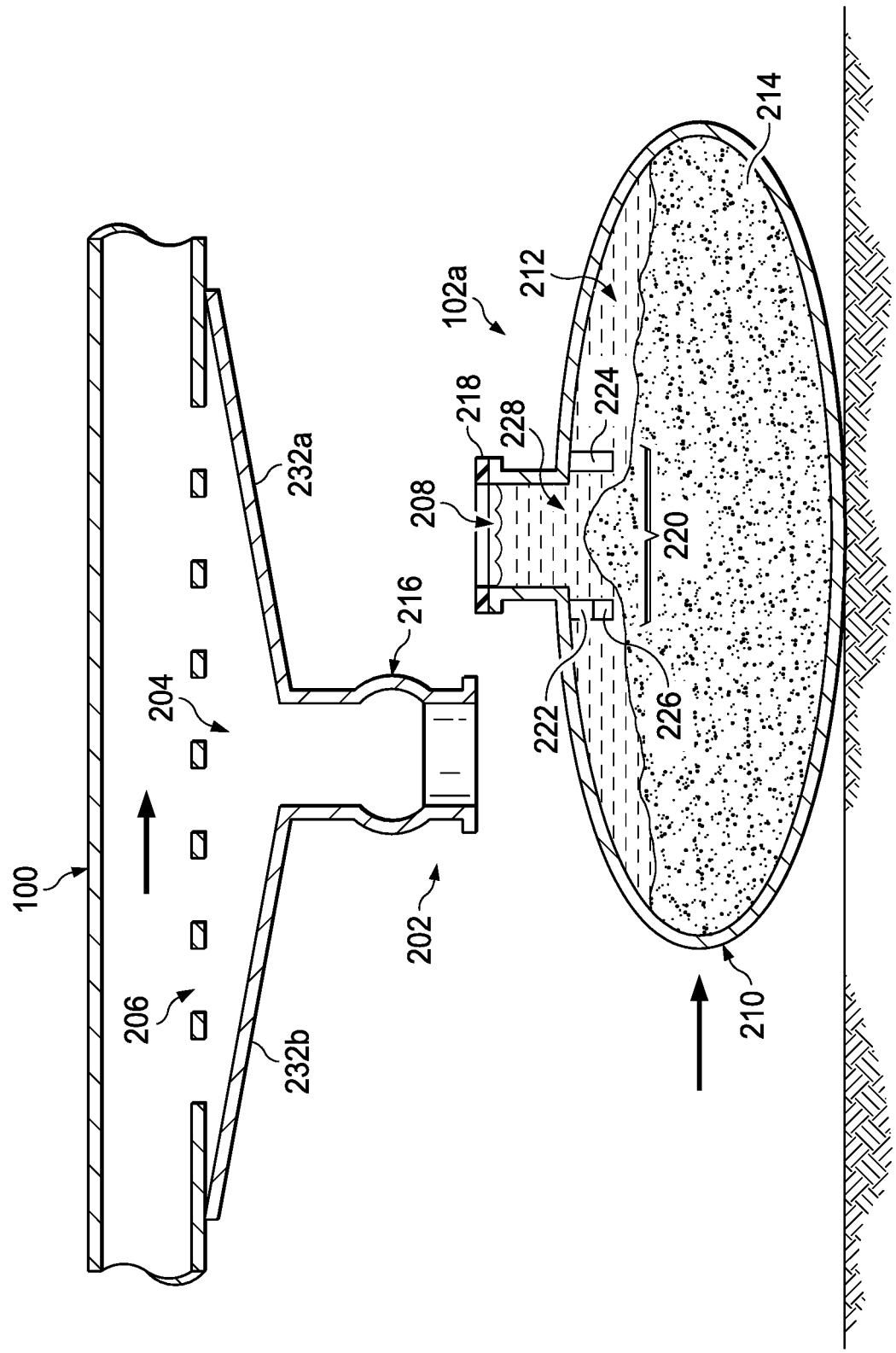
FIG. 2B is a schematic diagram of an example of a trap station detached from the flowline.

The tank 210 is detachably, fluidically coupled to the flowline 100. FIG. 2B is a schematic diagram of the trap station 102a detached from the flowline 100. When the tank 210 is fluidically coupled to the flowline 100, the portion of the multi-phase fluid 204 can flow from the fluid receiver body 202 into the tank 210. The tank 210 is detachable in that, at any time, the flow of the portion of the multi-phase fluid 204 can be ceased, and the tank 210 can be detached from the fluid receiver body 202, as shown in FIG. 2B. When the tank 210 is detached, fluid does not flow out of the fluid receiver body 202. The tank 210 can be re-attached to the fluid receiver body 202, and the fluidic coupling can be restored such that the portion of the multi-phase fluid 204 from the fluid receiver body 202 into the tank 210 resumes.

Fluid flow from the fluid receiver body 202 into the tank 210 can be controlled (that is, permitted or prevented) by a valve assembly 216, for example, a bore valve or other type of valve. In some implementations, the valve assembly 216 is coupled to the outlet portion 208 such that the valve assembly 216 remains with the outlet portion 208, that is, remains with the fluid receiver body 202, when the tank 210 is detached from the fluid receiver body 202. In such implementations, the valve assembly 216 can be in a closed state to prevent fluid flow out of the flowline 100 through the fluid receiver body 202.

In some implementations, the tank 210 can be sealed to the outlet portion 208 by a seal 218, for example, a flange seal or other seal. The seal 218 can be coupled to the outlet portion 208 such that the seal 218 remains with the outlet portion 208, that is, remains with the fluid receiver body 202, when the tank 210 is detached from the fluid receiver body 202. Alternatively, the seal 218 can be coupled to the tank inlet 228 such that the seal 218 is detachable with the tank 210. In some implementations, the seal 218 can include a component that remains with the outlet portion 208 and another component that is detachable with the tank 210. The two components can mate to fluidically seal the tank 210 to the outlet portion 208 when the tank 210 is fluidically coupled to the fluid receiver body 202.

FIG. 2C is a schematic diagram of a perforated plate member 228 of the trap station of FIGS. 2A and 2B. The plate member 228 can be coupled, for example, permanently attached by welding or other permanent attachment techniques, to the flowline 100. Because the plate member 228 is permanently, fluidically coupled to the flowline 100 and because the fluid receiver body 202 is permanently, fluidically coupled to the plate member 228, a portion of the trap station 102a remains fluidically coupled to the flowline 100 when the tank 210 is detached, for example, to empty the accumulated solids.

In some implementations, the inlet portion 206 can include or be defined by the plate member 228. The perforations (for example, perforations 230a, 230b) can be sized to permit solids in the multi-phase fluid flowing through the flowline 100 to enter the fluid receiver body 202. That is, the perforations are not sized to prevent the solids from entering the trap station 102a; rather, are sized to permit the solids to enter the trap station 102a. In some implementations, the plate member 228 can include tapered portions (for example, tapered portions 232a, 232b) that incline away from the flowline 100 and toward the inlet portion 204 to facilitate flow of the portion of the multi-phase fluid 204 into the trap station 102a.

As described earlier, the trap station 102a can determine that the tank 210 has accumulated a pre-determined quantity of solids. In some implementations, to do so, the trap station 210 can include a sensor assembly 220 that includes a wave source 224, a wave sensor 222 and a processor 226. The sensor assembly 220 can be coupled to the tank inlet 228 and can reside within the interior volume 212 of the tank 210. In some implementations, the wave source 224 and the wave sensor 222 can be arranged substantially parallel to the flowline 100 to which the fluid receiver body 202 is coupled. For example, the wave source 224 and the wave sensor 222 can be arranged to be apart with a space in between (for example, on two opposite sides of the tank inlet 228. The portion of the multi-phase fluid 204 can flow through the space in between the wave sensor 222 and the wave source 224.

The wave source 224 can transmit an electromagnetic wave. The wave sensor 222 can receive the electromagnetic wave transmitted by the wave source 224 and transmit a signal representing a magnitude of the electromagnetic wave. The processor 226 is coupled to the wave sensor 222. The processor 226 can receive the signal from the wave sensor 222 and determine that the tank 210 is substantially filled with solids based on the magnitude of the electromagnetic wave. In some implementations, the wave source 224 can send a constant signal (for example, constant amplitude, frequency over time) that is received by the wave sensor 222. An absence of a change in a signal value sensed by the wave sensor 222 indicates an absence of any interfering solid particles in the tank 210. When solids accumulate in the tank to a level at which the wave source 224 and the wave sensor 222 are positioned, then the solids interfere with the signal resulting in a change (for example, a decrease) in the signal value sensed by the wave sensor 222. In response, the processor 226 can initiate operations directed to replacing or emptying the tank 210

In the context of this disclosure, "substantially filled" means that the tank 210 includes sufficient solids to warrant closing the valve assembly 216 to detach the tank 210 from the fluid receiver body 202 and remove the solids from the tank 210. In some implementations, the tank 210 can be substantially filled with solids when the solids reach the space between the wave sensor 222 and the wave source 224.

Figure 3:
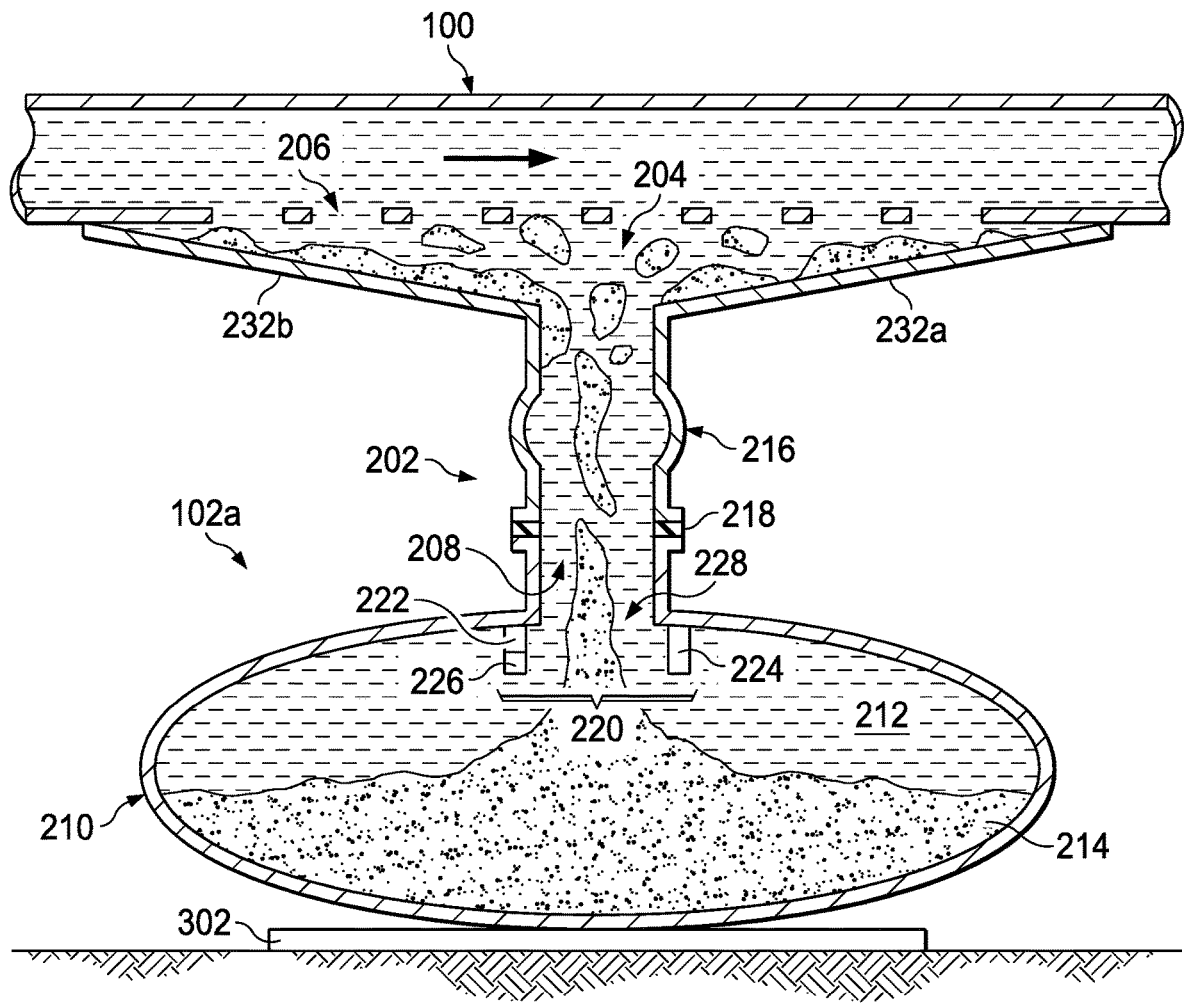
FIG. 3 is a schematic diagram of the trap station of FIGS. 2A and 2B.

In some implementations, the tank 210 can be substantially filled with solids when a pre-determined weight in the tank 210 is reached. FIG. 3 is a schematic diagram of the trap station 102a including a weigh scale 302. The weigh scale 302 can be positioned inside the tank 210 or attached to the outside and at the bottom of the tank 210. As the portion of the multi-phase fluid 204 flows into the tank 210, the weight registered by the weigh scale 302 can increase. When the weight reaches a pre-determined weight threshold, the weigh scale 302 can transmit a signal indicating that the tank 210 is substantially filled with solids.

In response to determining that the tank is substantially filled with solids, a signal can be transmitted to the valve assembly 216 to automatically switch from an open state to the closed state. For example, the processor 226 can be operatively coupled to the valve assembly 216 and can transmit instructions to the valve assembly 216 to be opened or closed. In another example, the weigh scale 302 can be operatively coupled to the valve assembly 216 like the processor 226. When the processor 226 or the weigh scale 302 determines that the tank 210 is substantially filled with solids, the processor 226 or the weigh scale 302 can transmit an instruction to the valve assembly 216 to be closed. In response, the valve assembly 216 can automatically, that is, without user intervention, close, thereby preventing further flow of the multi-phase fluid from the fluid receiver body 202 into the tank 210. Alternatively, the processor 226 or the weigh scale 302 can transmit a signal indicating that the tank 210 is substantially filled with solids either over a wired or wireless connection, for example, to a terminal monitored by operations personnel. The personnel can then manually close the valve assembly 216. With the valve assembly 216 closed, the personnel can detach the tank 210 from the fluid receiver body 202.

Figure 4:
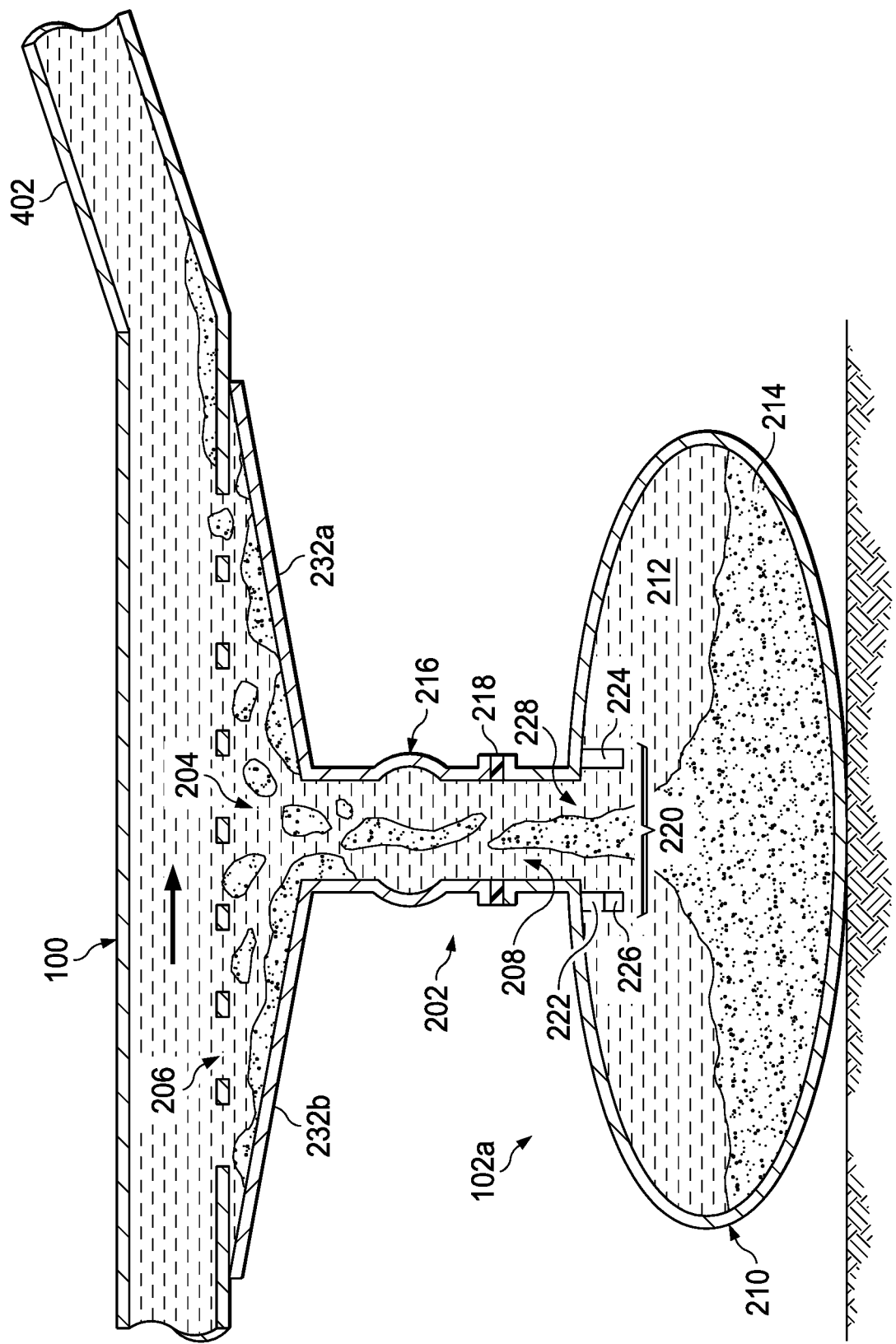
FIG. 4 is a schematic diagram of the trap station of FIGS. 2A and 2B.

FIG. 4 is a schematic diagram of the trap station 102a of FIGS. 2A and 2B. In some implementations, the trap station 102a can include an elongated tubular member 402 fluidically coupled to the flowline 100 downstream of the fluid receiver body 202. The elongated tubular member 402 can be oriented, for example, inclined vertically upward relative to and away from the fluid receiver body 202. The orientation of the elongated tubular member 402 can be selected such that a speed of the solids in the multi-phase fluid flowing through the tubular member 402 are slowed, for example, because of gravity as the solids climb the incline. Under gravity, the solids can fall backward into the fluid receiver body 202 and accumulate in the tank 201.

FIG. 5 is a flowchart of an example of a process 500 for trapping solids using the trap station of FIGS. 2A and 2B. Certain process steps of the process 500 can be implemented by a solids trap station, for example, one of the trap stations (such as trap station 102a) described earlier. Certain process steps can be implemented by operations personnel operating or maintaining (or both) a flowline through which multi-phase fluids are flowed. At 502, multi-phase fluid including solids is received into a fluid receiver body, for example, the fluid receiver body 202. At 504, the multi-phase fluid is flowed into a tank detachably coupled to the fluid receiver body, for example, the tank 210 detachably, fluidically coupled to the fluid receiver body 202. At 506, it is determined that the tank is substantially filled with solids. For example, either the processor 226 or the weigh scale 302 can determine that the tank 210 is substantially filled with solids. At 508, the tank is detached from the fluid receiver body to empty the solids. For example, the valve assembly 216 can be closed, either responsive to an instruction from the processor 226 or the weigh scale 302 or by operations personnel. Subsequently, the tank 210 can be detached from the fluid receiver body 202. The solids in the tank 210 can be emptied, the tank 210 can be re-attached to the fluid receiver body 202, and the valve assembly 216 can be re-opened.

Thus, particular implementations of the subject matter have been described. Other implementations are within the scope of the following claims.

The invention claimed is:

1. A method comprising:
   from a flowline carrying a multi-phase fluid comprising solids and liquids, receiving a portion of the multi-phase fluid comprising a portion of the solids into a multi-phase fluid receiver body fluidically coupled to the flowline;
   flowing the portion of the multi-phase fluid into a tank fluidically and detachably coupled to the fluid receiver body;
   after flowing the portion of the multi-phase fluid into the tank, determining that the tank is substantially filled with the solids; and
   in response to determining that the tank is substantially filled with the solids, detaching the tank from the fluid receiver body, wherein the fluid receiver body remains coupled to the flowline after the tank is detached.

2. The method of claim 1, wherein determining that the tank is substantially filled with the solids comprises determining a magnitude of an electromagnetic wave transmitted by a wave source coupled to the tank and sensed by a wave sensor coupled to the tank.

3. The method of claim 2, wherein determining that the tank is substantially filled with the solids comprises determining, by a weigh scale coupled to the tank, a weight of the solids in the tank.

4. The method of claim 3, further comprising:
   emptying the solids in the tank; and
   re-coupling the tank to the fluids receiver body.

5. The method of claim 1, further comprising preventing, by a valve assembly coupled to an outlet portion of the fluid receiver body, flow of the portion of the multi-phase fluid out of the fluid receiver body before detaching the tank from the fluid receiver body.

* * * * *